(12) United States Patent
Umeda

(10) Patent No.: US 11,934,562 B2
(45) Date of Patent: Mar. 19, 2024

(54) DATA PROCESSING DEVICE, DATA PROCESSING METHOD, DATA PROCESSING PROGRAM, TERMINAL DEVICE, AND DATA PROCESSING SYSTEM

(71) Applicant: SONY GROUP CORPORATION, Tokyo (JP)

(72) Inventor: Tetsuo Umeda, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 38 days.

(21) Appl. No.: 17/297,211

(22) PCT Filed: Dec. 26, 2019

(86) PCT No.: PCT/JP2019/051210
§ 371 (c)(1),
(2) Date: May 26, 2021

(87) PCT Pub. No.: WO2020/149141
PCT Pub. Date: Jul. 23, 2020

(65) Prior Publication Data
US 2022/0027516 A1    Jan. 27, 2022

(30) Foreign Application Priority Data

Jan. 15, 2019  (JP) .............................. 2019-004215

(51) Int. Cl.
*H04L 29/06*  (2006.01)
*G06F 16/23*  (2019.01)
(Continued)

(52) U.S. Cl.
CPC .......... *G06F 21/64* (2013.01); *G06F 16/2365* (2019.01); *G06F 21/552* (2013.01); *G06F 21/62* (2013.01)

(58) Field of Classification Search
CPC ...................................................... G06F 21/62
See application file for complete search history.

(56) References Cited

U.S. PATENT DOCUMENTS

2013/0291128 A1 *  10/2013  Ito ....................... G06F 21/6254
726/30
2016/0239527 A1 *  8/2016  Jang .................... G06F 16/2228
(Continued)

FOREIGN PATENT DOCUMENTS

JP     H06-290274 A     10/1994
JP     2010-166228 A    7/2010
(Continued)

OTHER PUBLICATIONS

Fanti et al., Building a RAPPOR with the Unknown: Privacy-Preserving Learning of Associations and Data Dictionaries, Proceedings on Privacy Enhancing Technologies, May 6, 2016, pp. 41-61, vol. 2016, No. 3.

(Continued)

*Primary Examiner* — Jason K Gee
(74) *Attorney, Agent, or Firm* — Paratus Law Group, PLLC

(57) ABSTRACT

Provided is a data processing device including: a noise removal unit that removes noise from data to which noise has been added, the data having been received from a terminal device; a measurement unit that measures the data for each data type constituting a data set and indicating a classification of the data; and a data set updating unit that updates the data set on the basis of a measurement result of the measurement unit.

16 Claims, 18 Drawing Sheets

(51) Int. Cl.
  *G06F 21/55* (2013.01)
  *G06F 21/62* (2013.01)
  *G06F 21/64* (2013.01)

(56) References Cited

U.S. PATENT DOCUMENTS

2016/0292455 A1* 10/2016 Jebara ................. G06F 16/9535
2016/0350557 A1* 12/2016 Mikami .............. G06F 16/2282
2017/0293772 A1   10/2017 Chen et al.
2018/0039619 A1    2/2018 Thakurta et al.
2018/0322279 A1   11/2018 Beskorovajnov et al.
2020/0186567 A1*  6/2020 Hebert .................. G06N 3/045

FOREIGN PATENT DOCUMENTS

JP    2016-054002 A    4/2016
JP    2019-175002 A   10/2019

OTHER PUBLICATIONS

Qin et al., Heavy Hitter Estimation over Set-Valued Data with Local Differential Privacy, Proceedings of the 2017 ACM on Conference on Information and Knowledge Management, CIKM '17, Oct. 24, 2016, pp. 192-203.

* cited by examiner

DATA PROCESSING DEVICE, DATA PROCESSING METHOD, DATA PROCESSING PROGRAM, TERMINAL DEVICE, AND DATA PROCESSING SYSTEM

CROSS REFERENCE TO PRIOR APPLICATION

This application is a National Stage Patent Application of PCT International Patent Application No. PCT/JP2019/051210 (filed on Dec. 26, 2019) under 35 U.S.C. § 371, which claims priority to Japanese Patent Application No. 2019-004215 (filed on Jan. 15, 2019), which are all hereby incorporated by reference in their entirety.

TECHNICAL FIELD

The present technology relates to a data processing device, a data processing method, a data processing program, a terminal device, and a data processing system.

BACKGROUND ART

Recently, with the development of the Internet and the spreading of devices able to access the Internet, various types of data in a device have been collected by companies that provide Internet services, companies that develop devices, and the like and used for service improvement, product development, and the like. One of types of useful data among such data is data with respect to individual users who use devices. As data with respect to an individual user, there are various types of data such as that regarding a method of using a device and a usage status when a service is used on the Internet through a device.

Since such data of individual users has a high utility value, whereas there is a problem that the privacy of users may be invaded due to data leakage, a data handling method, and the like. Accordingly, a technology called differential privacy is used in order to prevent invasion of privacy.

Differential privacy is a technology for applying noise to collected data to enable use of the data itself while preventing a user or the like that is a subject of the data from being identified. It is not possible to trust the hypothesis "certain data belongs to a specific user" beyond a certain statistical degree. Differential privacy has characteristics that the influence on privacy can be quantitatively evaluated because mathematical stability is provided for attacks according to any background knowledge. It is possible to prevent invasion of privacy of a user even when data has been collected without obtaining the approval of the user by using differential privacy. Differential privacy includes output type differential privacy and local type differential privacy.

In output type differential privacy, raw data is collected from devices and managed in a database constructed on a cloud. By opening data to which noise has been added, the privacy of a user is protected when a data user accesses the database and uses data. Since a cloud service provider manages raw data, there is concern of there being a psychological barrier for a user regarding collection of raw data, business risk for the provider when the data leaked, and the like.

Local type differential privacy is a method of adding noise through a user device and collecting anonymized data in a cloud. It is possible to acquire statistics from which noise has been removed from the cloud when the data is used. Since data is collected in a state in which the data has been anonymized, a psychological barrier for a user is low and business risk for a service provider when the data is leaked is also low.

SUMMARY

Technical Problem

Such differential privacy is generally based on the premise that a large quantity of data to be collected is present because the accuracy becomes higher when a larger quantity of data to be collected is present. However, a large quantity of data may not be collected depending on the data type, and there is a problem that such data may be not able to be used appropriately for differential privacy.

The present technology has been made in view of such problems, and an object thereof is to provide a data processing device, a data processing method, a data processing program, a terminal device, and a data processing system capable of improving accuracy by decreasing an amount of error in statistical results of data to which noise has been added in utilization of differential privacy that adds noise to data.

Solution to Problem

To solve the aforementioned problems, a first technology is a data processing device including a noise removal unit that removes noise from data to which noise has been added, the data having been received from a terminal device, a measurement unit that measures the data for each data type which constitutes a data set and indicates a classification of the data, and a data set updating unit that updates the data set on the basis of measurement results of the measurement unit.

In addition, a second technology is a data processing method that removes noise from data to which noise has been added, the data having been received from a terminal device, measures the data for each data type which constitutes a data set and indicates a classification of the data, and updates the data set on the basis of a measurement result.

In addition, a third technology is a data processing program causing a computer to execute a data processing method that removes noise from data to which noise has been added, the data having been received from a terminal device, measures the data for each data type which constitutes a data set and indicates a classification of the data, and updates the data set on the basis of a measurement result.

In addition, a fourth technology is a terminal device that associates data with data types, adds noise to the data, and transmits the data to which noise has been added to a data processing device on the basis of information indicating a data set composed of the data types to which the data belongs, the data set having been transmitted from the data processing device.

Furthermore, a fifth technology is a data processing system including a terminal device that associates data with data types, adds noise to the data, and transmits the data to which noise has been added to a data processing device on the basis of information indicating a data set composed of the data types to which data belongs, the data set having been transmitted from the data processing device, and a data processing device including a noise removal unit that removes noise from data to which noise has been added, the data having been received from the terminal device, a measurement unit that measures the data for each data type which constitutes a data set and indicates a classification of the data, and a data set updating unit that updates the data set on the basis of a measurement result of the measurement unit.

DESCRIPTION OF EMBODIMENTS

Hereinafter, embodiments of the present technology will be described with reference to the drawings. The description will be given in the following order.

<1. Description of differential privacy>
<2. Embodiment>
[2-1. Configuration of data processing system 10]
[2-2. Description of regional mesh]
[2-3. Configuration of terminal device 100]
[2-4. Configuration of server device 300]
[2-5. Processing in terminal device 100]
[2-6. Processing in server device 300]
[2-7. Dictionary updating processing]
<3. Modified examples>

1. Description of Differential Privacy

First, differential privacy used in the present technology will be described prior to description of embodiments of the present technology. Differential privacy is a technology for applying noise to collected data to enable use of the data itself while preventing a user or the like that is a subject of the data from being identified. In the present technology, local type differential privacy that adds noise in a device (corresponding to the terminal device 100 of an embodiment) in hand of a user and collects anonymized data in a cloud (corresponding to the server device 300 of the embodiment) is used.

Figure 1:
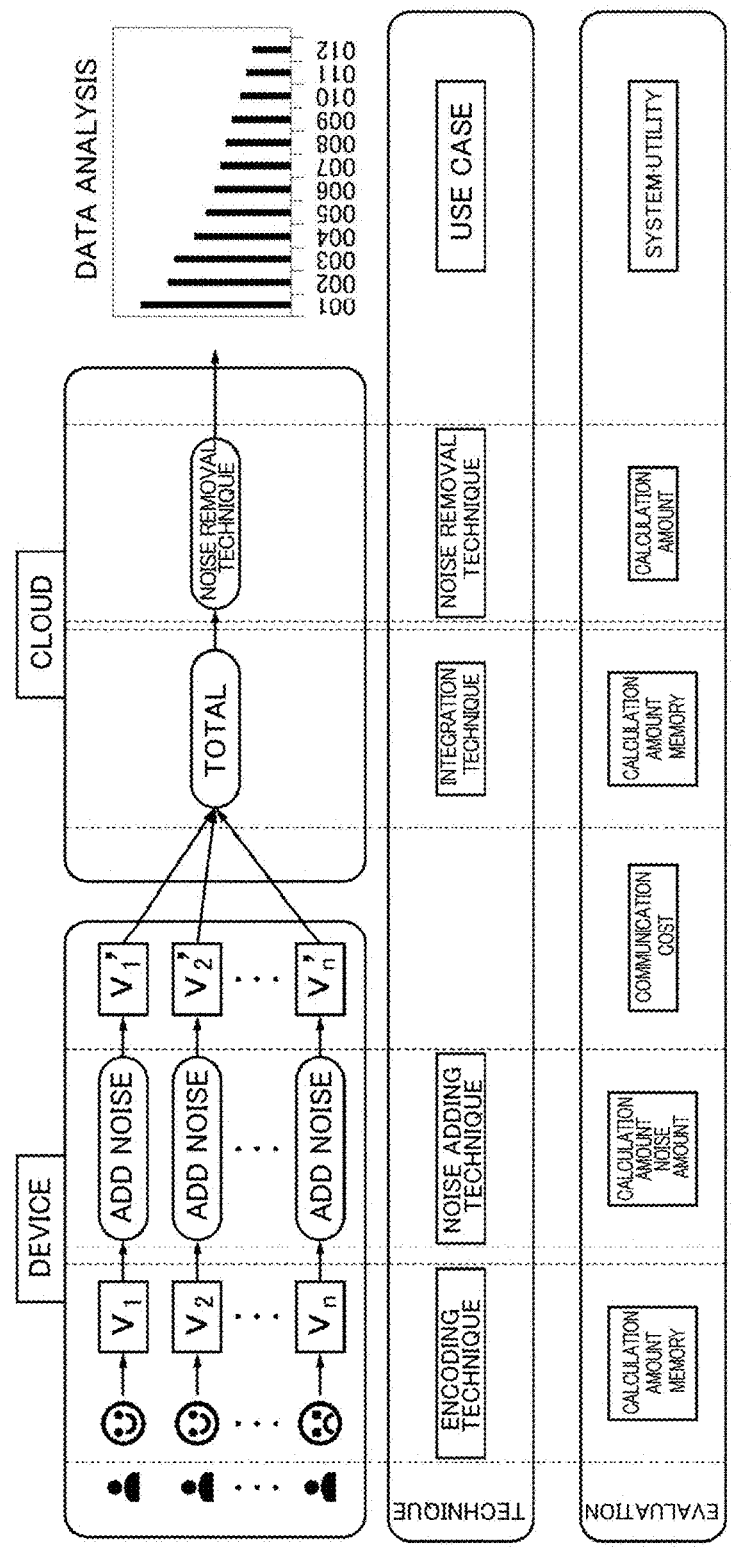
FIG. 1 is a diagram for describing an outline of differential privacy.

As illustrated in a schematic diagram of FIG. 1, local type differential privacy is composed of a encoding technique for encoding data in a device to generate a bit string $v_1$, a noise adding technique for adding noise to the bit string $v_1$ according to a certain random variable to generate data $v_1'$, an integration technique for collecting data to which noise has been added, a noise removal technique for removing noise from integrated data (the integration technique and the noise removal technique are simultaneously executed in many cases, and the two techniques may be combined and called a decoding technique), and a data analysis technique for performing visualization processing according to use case of analysis.

In the present technology, "sample size", "dictionary size", and "privacy index" are used as major parameters at the time of using differential privacy.

The sample size indicates a total number of pieces of data collected in a cloud. The sample size can be defined as "number of users having devices×number of pieces of data transmitted from devices to the cloud".

The dictionary size indicates a total number of data types included in a dictionary. A dictionary is a set of data in which data is combined for each data type indicating a data classification and corresponds to a data set in the claims.

The dictionary size is determined by the number of data types. For example, categories of sex defined in ISO5218 are four types of male, female, unidentified, and inapplicable, and thus the number of data types is 4 and, in this case, dictionary size=4. In addition, the number of pictorial symbols used for character input in a smartphone, for example, is currently about 2,600 and the number of data types is about 2,600, and in this case, dictionary size=about 2,600. Further, in a case where position information of a global positioning system (GPS) is mapped to a regional mesh of 1 $km^2$, the number of meshes reaches about 380,000, and thus the number of data types is about 380,000 and dictionary size=about 380,000.

The privacy index indicates a degree of privacy protection in differential privacy. As a privacy index value decreases, a degree of privacy protection increases and the amount of noise added to data increases. In contrast, as the privacy index value increases, the degree of privacy protection decreases and the amount of noise added to data decreases.

The privacy index value is determined as a predetermined value depending on a sensitivity of handled data. For example, the privacy index may be set to 4 in a case where pictorial symbols used for character input in a smartphone need to be anonymized by adding noise thereto and set to 2 in the case of health care information such as a pulse. Meanwhile, these specific values of the privacy index are merely examples and the present technology is not limited to these values.

Figure 2:
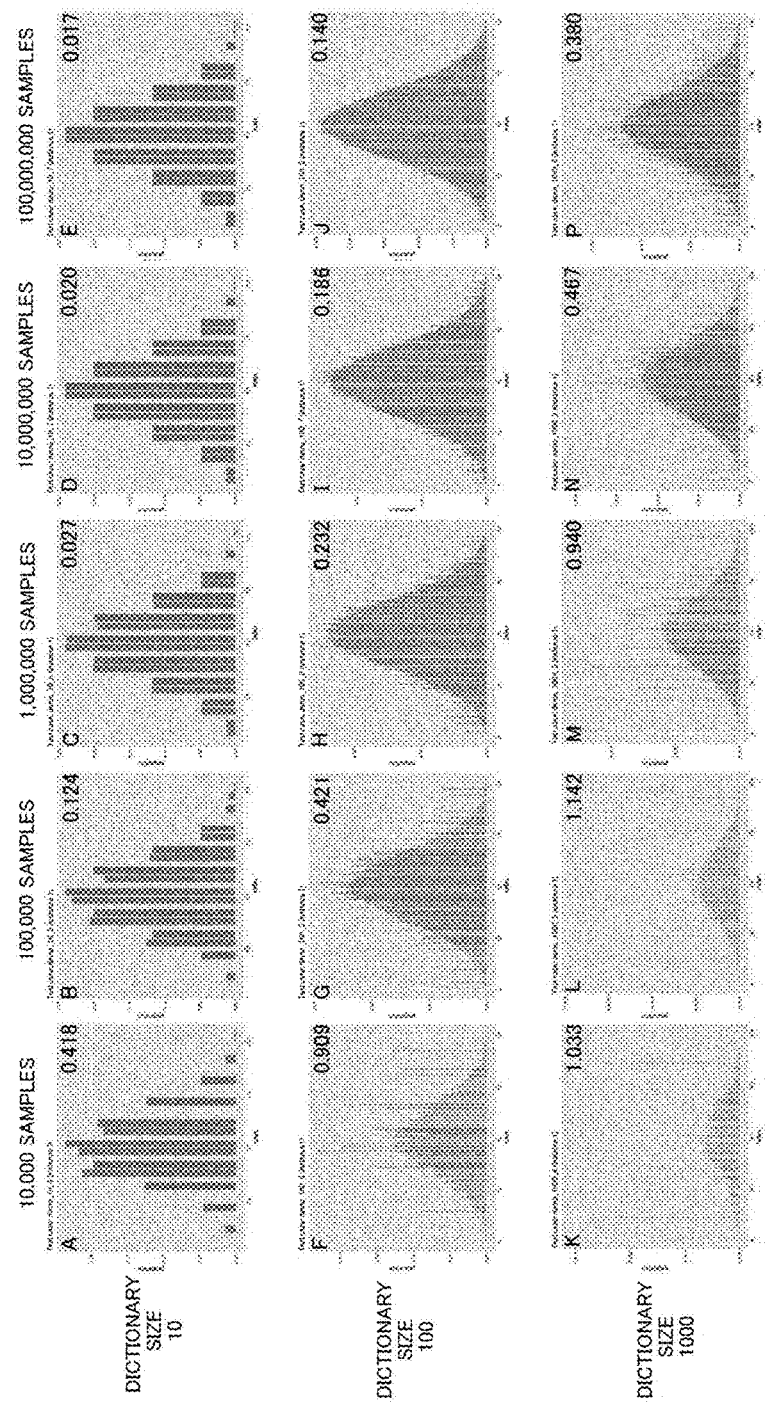
FIG. 2 is a graph group illustrating a relationship between a sample size, a dictionary size, and an error.

FIG. 2 is a graph group illustrating a relationship among a sample size, a dictionary size, and an error when the privacy index is a predetermined value. The error is a difference between a measured value (hereinafter referred to as correct answer value) of data to which noise has not been added and a measured value (referred to as a measurement value to which noise has been added) of the data to which noise has been added according to differential privacy. In the graphs of FIG. 2, in each bar graph in which bars are arranged in pairs, the right side represents a measured value (correct answer value) of data to which noise is not added, and the left side represents a measured value (measurement value to which noise has been added) of the data to which noise has been added according to differential privacy.

In FIG. 2, it is assumed that the dictionary size is 10 in graphs A to E in the upper part, 100 in graphs F to J in the middle part, and 1000 in graphs K to P in the lower part.

The sample size is 10,000 in vertically arranged graphs A, F, and K. In addition, the sample size is 100,000 in vertically arranged graphs B, G, and L. In addition, the sample size is 1,000,000 in vertically arranged graphs C, H, and M. In addition, the sample size is 10,000,000 in vertically arranged graphs D, I, and N. Further, the sample size is 100,000,000 in vertically arranged graphs E, J, and P. Meanwhile, it is assumed that the privacy index is identical in all graphs.

A value indicated at the upper right of each graph is an error between a correct answer value and a measurement value to which noise has been added in the corresponding graph.

As ascertained from the graph group of FIG. 2, the error decreases as the dictionary size decreases when graphs having the same sample size are compared to each other. In addition, when graphs having the same dictionary size are compared to each other, it can be ascertained that the error decreases as the sample size increases. In differential privacy, when an error between a correct answer value and a measurement value to which noise has been added decreases, data with high reliability can be acquired while the privacy of the data is protected, which is desirable.

Figure 3:
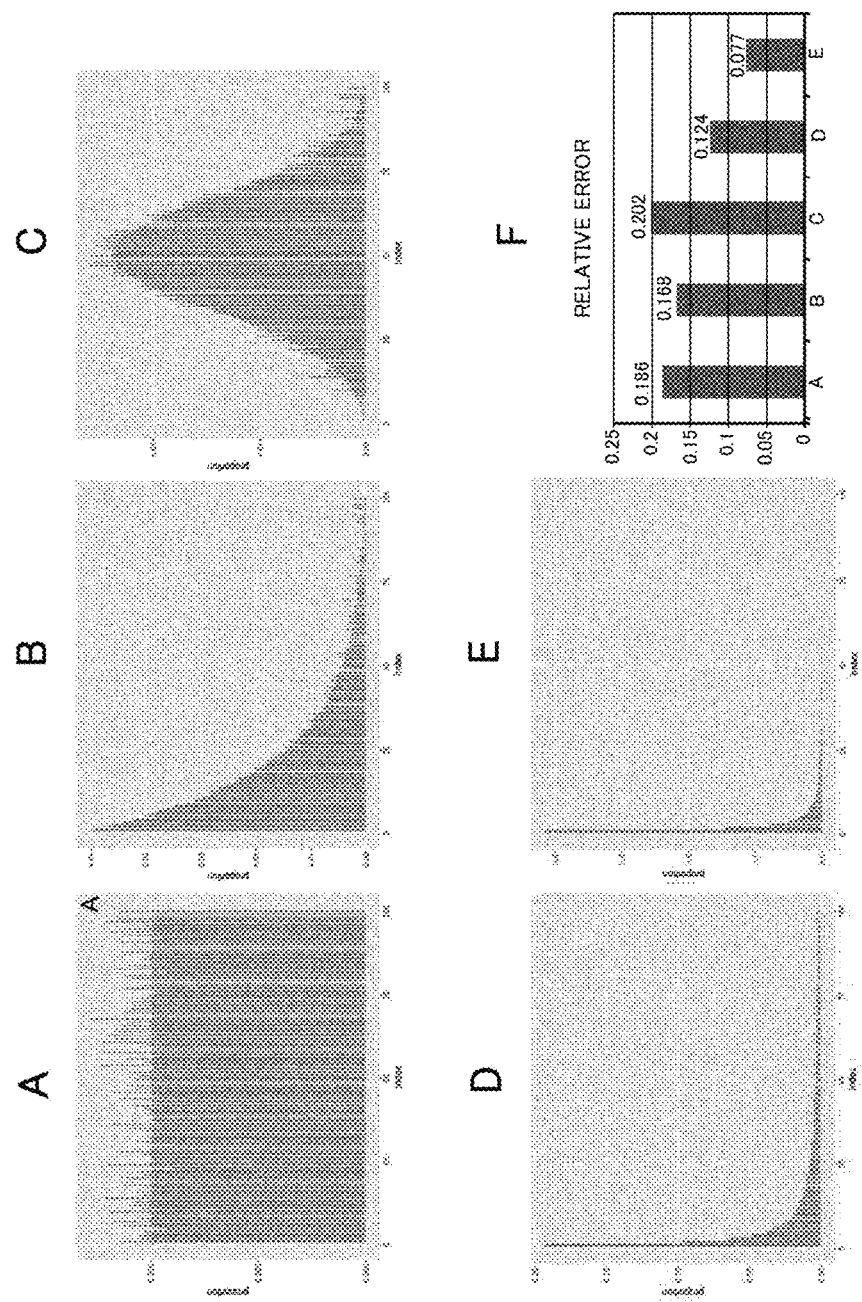
FIG. 3A to FIG. 3E are a graph group illustrating a relationship between a data distribution and an error.
FIG. 3F is a graph showing a relative error in a data distribution.

FIG. 3A to FIG. 3E are a graph group illustrating a relationship between a data distribution and an error between a correct answer value and a measurement value to which noise has been added, and FIG. 3F is a graph illustrating a relative error in each distribution. It is assumed that the sample size is identical, the dictionary size is identical, and the privacy index is identical in the graphs of FIG. 3A to FIG. 3E. As ascertained from FIG. 3F, relative errors are different according to data distributions in spite of the same sample size, the same dictionary size, the same privacy index.

Figure 4:
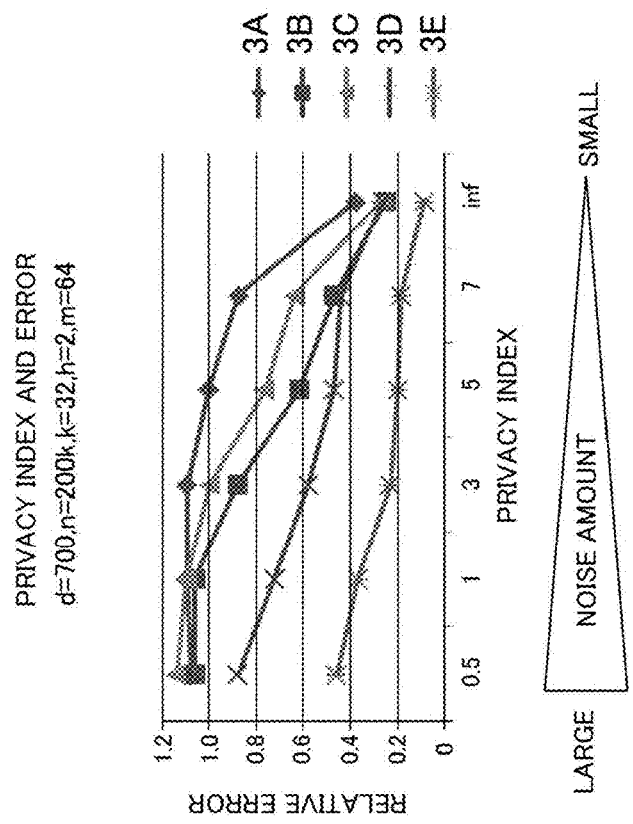
FIG. 4 is a graph illustrating a relationship between a data distribution and a privacy index.

FIG. 4 is a graph illustrating a relationship between types of the data distributions illustrated in FIG. 3A to FIG. 3E and a privacy index value. As ascertained from FIG. 4, when the privacy index value decreases, the amount of noise added to data increases and an error also increases even though distributions are different. In contrast, when the privacy index value increases, the amount of noise added to data decreases and an error also decreases.

It can be ascertained from such relationship among the sample size, the dictionary size, and the privacy index that the sample size, the dictionary size, and the privacy index have the following trade-off relationship.

When the dictionary size is constant and the privacy index is constant, an error increases as the sample size decreases.

In addition, when the dictionary size is small, an error is assumed to be small even if the sample size is small. In contrast, when the dictionary size is large, an error is large even if the sample size is large.

Further, when the sample size is constant and the dictionary size is constant, an error increases when the privacy index decreases and the error decreases when the privacy index increases. Accordingly, it is necessary to increase the sample size in order to increase privacy strength to improve reliability.

In local type differential privacy, an error that is a difference between statistical results of a correct answer value and a measurement value to which noise has been added is used as an evaluation index. Accordingly, local type differential privacy has the advantage that an error does not change even when a noise amount is increased to improve sensitivity in the case of the same sample size and the same dictionary size. In addition, local type differential privacy has the advantage that an error does not change even when the sample size decreases in the case of the same dictionary size and the same privacy index. This is because lots of measured values (data) need to be acquired to increase the sample size in general, which is costly.

Meanwhile, when a system using differential privacy is actually operated, a correct answer value to which noise is not added cannot be acquired and thus an error cannot be calculated. Accordingly, in the present technology, reliability is defined as an index of effectiveness of differential privacy instead of an error.

Variation in a plurality of combined results of data is evaluated for each data type constituting a dictionary. A variation coefficient for comparing different data types is used as reliability. The variation coefficient is an index that relatively evaluates a relationship between a measured value (data) and variation with respect to an average value and can be obtained from the following formula 1.

$$\text{Variation coefficient} = \text{Standard deviation}/\text{Average} \quad [\text{Math. 1}]$$

Figure 5:
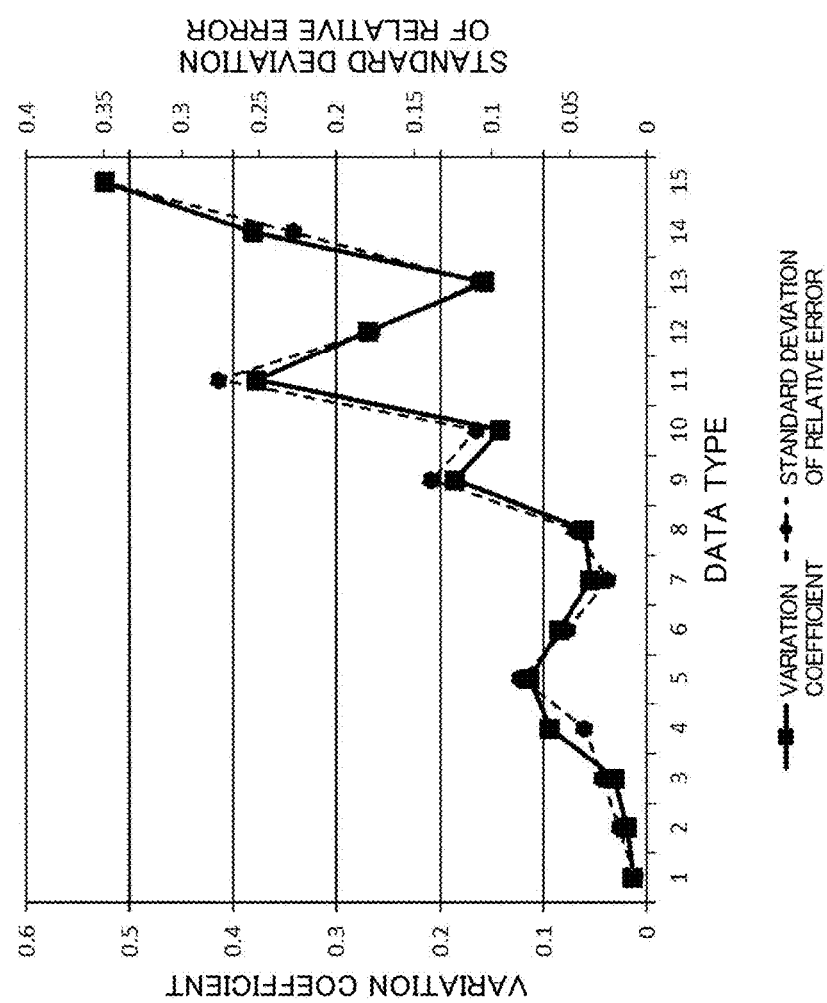
FIG. 5 is a graph illustrating a relationship between a variation coefficient and a relative error.

FIG. 5 is a graph illustrating a relationship between the variation coefficient and a relative error when the vertical axis represents the variation coefficient and a relative error of a relative error and the horizontal axis represents a data type (serial numbers starting from 1). As illustrated in FIG. 5, the variation coefficient calculated from a measurement value to which noise has been added has a correlation with a relative error. Accordingly, the variation coefficient can be used as an index of effectiveness of differential privacy. Therefore, the variation coefficient is used as the index of effectiveness of differential privacy as reliability. When the variation coefficient is low, an error is also small and thus reliability is high. In contrast, when the variation coefficient is high, an error is also large and thus reliability is low.

To decreases an error between a result to which differential privacy has been applied and a result to which differential privacy has not been applied with a small sample size, it is necessary to decrease the dictionary size. In addition, an error between a result to which differential privacy has been applied and a result to which differential privacy has not been applied changes according to data distribution even under the same conditions (same sample size, same dictionary size, and same privacy index). Accordingly, in order to decrease an error by optimizing the dictionary size, it is necessary to match the dictionary size to a data distribution. However, an actual sample size and data distribution cannot be ascertained unless data is collected.

Therefore, in the present technology, the dictionary size is optimized by updating the dictionary size in accordance with a data distribution while collecting data. Specifically, reliability of each data type constituting a dictionary that is a data set is calculated and data types are combined or divided in response to reliabilities to update the dictionary size. Local type differential privacy is executed using the dictionary having the updated dictionary size, reliability is re-evaluated, and the dictionary size is updated. In this manner, combining/division of data types are repeated in response to reliabilities. Data types with high reliabilities are divided and data types with low reliabilities are combined.

Figure 6:
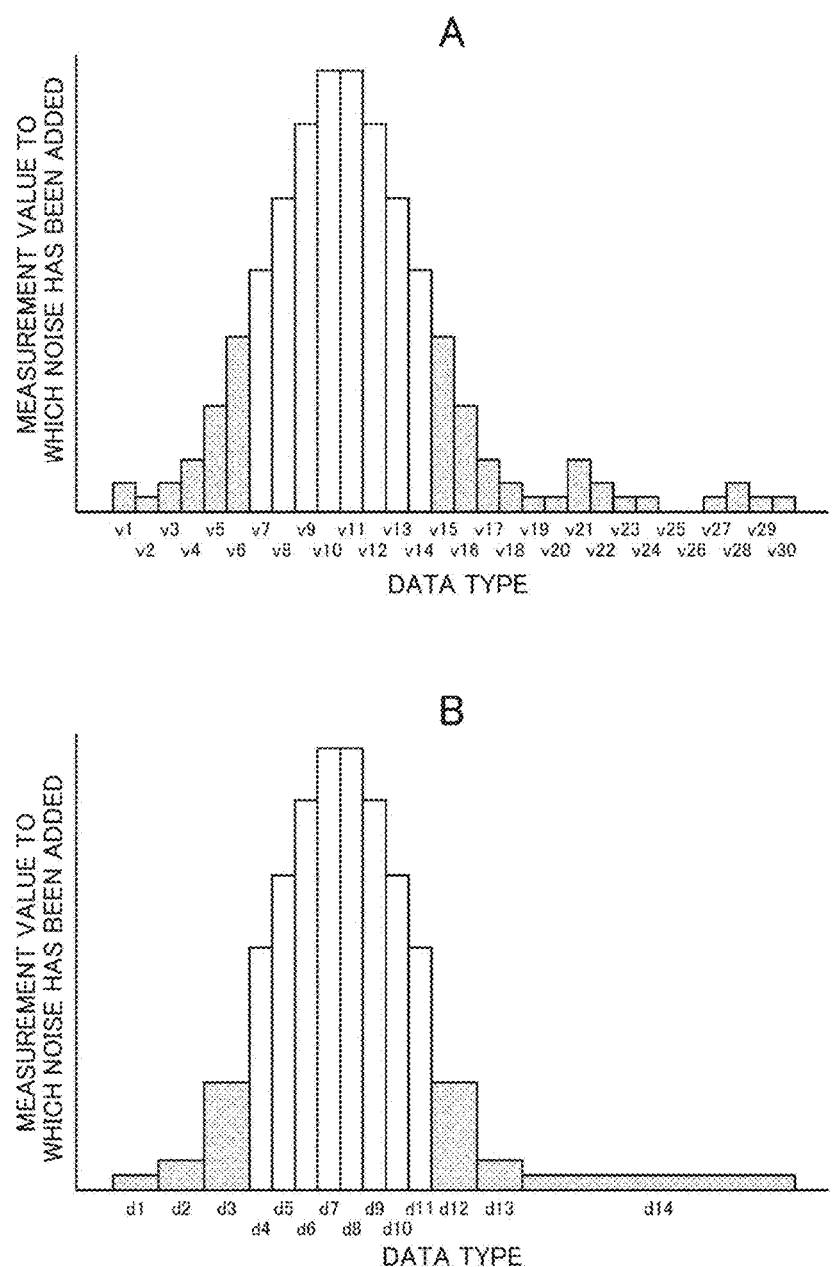
FIG. 6 is an explanatory diagram of dictionary update according to combining of data types.

In an example of FIG. 6, data types v1 and v2, v3 and v4, and v5 and v6 illustrated in FIG. 6A are respectively combined into data types d1, d2, and d3 as illustrated in FIG. 6B to reduce a dictionary size. Further, data types v15 to v30 are combined into a data type d14 as illustrated in FIG. 6B to reduce the dictionary size. While data of the data types v1 and v2 is measured as data of separate data types before dictionary update, the data measured as data of v1 and v2 is measured as data of the data type d1 with respect to the new data types d1 obtained by combining v1 and v2. The same applies to d2 obtained by combining v3 and v4, d3 obtained by combining v4 and v5, and d14 obtained by combining v15 to v30. In this manner, it is possible to reduce an error between a result to which differential privacy has been applied and a result to which differential privacy has not been applied and acquire statistical results with high accuracy even with a small sample size by combining data types to reduce the dictionary size.

When the number of data types increases and thus a dictionary size increases, the number of pieces of data included in each data type decreases, and thus an error between a correct answer value and a measurement value to which noise has been added increases. In contrast, when the number of data types is reduced and thus the dictionary size decreases, the number of pieces of data included in each data type increases, and thus an error between a correct answer value and a measurement value to which noise has been added decreases to improve accuracy. It can be said that the accuracy of statistical results is improved when a dictionary is updated, data is collected on the basis of the dictionary, and a measured value to which noise has been added approaches a correct answer value. In addition, as described in the above description of the trade-off relationship between the sample size and the dictionary size, when the dictionary size is small, it is desirable to combine data types to reduce the dictionary size because an error decreases to improve the accuracy of differential privacy even though the sample size is small.

2. Embodiment

[2-1. Configuration of Data Processing System 10]

Next, a configuration of a data processing system 10 using the above-described differential privacy will be described. In this embodiment, the present technology is described through an example in which differential privacy is used in collection of data using a regional mesh. In this embodiment, position information from a specific type of smartphone manufactured by a specific manufacturer as a terminal device 100 is acquired to ascertain a distribution of users using the terminal device 100 in the whole area of Japan.

Figure 7:
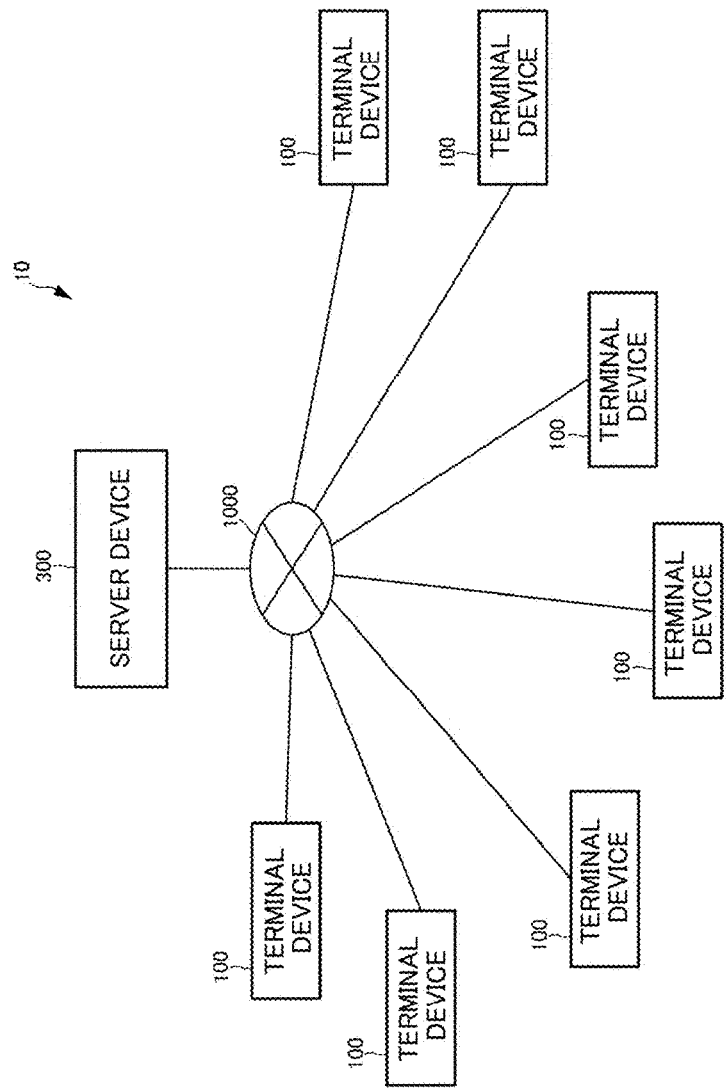
FIG. 7 is a block diagram illustrating a configuration of a data processing system.

As illustrated in FIG. 7, the data processing system 10 includes a server device 300 and a plurality of terminal devices 100. The server device 300 and the plurality of terminal devices 100 are connected through a network 1000 such as the Internet. Meanwhile, although seven terminal devices 100 are illustrated for convenience of description and drawing, more than seven terminal devices 100 connected to the server device 300 are present.

For example, the server device 300 is a device for collecting data from the terminal devices 100 using differential privacy according to the present technology which is operated by the manufacturer or the like that manufactures the terminal devices 100 to acquire statistical results. The server device 300 corresponds to the cloud in the above-description of differential privacy.

The terminal device 100 is a specific type of smartphone manufactured by a specific manufacturer. The terminal device 100 transmits a log including position information thereof to the server device 300 regularly or at a predetermined timing.

[2-2. Description of Regional Mesh]

Here, a regional mesh used to ascertain a distribution of users using the specific terminal device 100 will be described. The regional mesh are obtained by dividing a region into grid squares (mesh) having almost the same size on the basis of latitude/longitude to be used for statistics. Codes for identifying each mesh are regional mesh codes.

The regional mesh are classified into first-order mesh, second-order mesh, and third-order mesh depending on mesh sizes. The first-order mesh uses a section of one map sheet of a geographic map on the scale of 1:200,000 as one unit section and has a latitude difference of 40 minutes, a longitude difference of 1 degree, and the length of a side of about 80 km. The second-order mesh is areas obtained by dividing the second-order mesh into eight equal parts in the latitudinal direction and the longitudinal direction and corresponds to a section of one map sheet of a topographic map on the scale of 1:25,000. It has a latitude difference of 5 minutes, a longitude difference of 7 minutes 30 seconds, and the length of a side of about 10 km. The third-order mesh is areas obtained by dividing the second-order mesh into ten equal parts in the latitudinal direction and the longitudinal direction. It has a latitude difference of 30 seconds, a longitude difference of 45 seconds, and the length of a side of about 1 km.

It is possible to ascertain a distribution of users of the terminal devices 100 in the whole area of Japan by collecting position information of the plurality of terminal devices 100. The number of regional meshes is set to data types constituting a dictionary, and the number of data types is set to a dictionary size.

Since the whole area of Japan can be covered using 176 meshes in the first-order mesh, the number of data types constituting a dictionary becomes 176 and the dictionary size becomes 176 when only the first-order mesh is used. When the whole area of Japan is covered with the first-order mesh, remote islands, underpopulated areas, mountain areas, and the like are included in the mesh, which is wasteful.

Since the whole area of Japan can be covered using 4,862 meshes in the second-order mesh, the number of data types constituting a dictionary becomes 4,862 and the dictionary size becomes 4,862 when only the second-order mesh is used. Like the first-order mesh, remote islands, underpopulated areas, mountain areas, and the like are also included in the second-order mesh, which is wasteful.

Since the whole area of Japan can be covered using 387,286 meshes in the third-order mesh, the number of data types constituting a dictionary becomes 387,286 and the dictionary size becomes 387,286 when only the third-order mesh is used.

Figure 8:
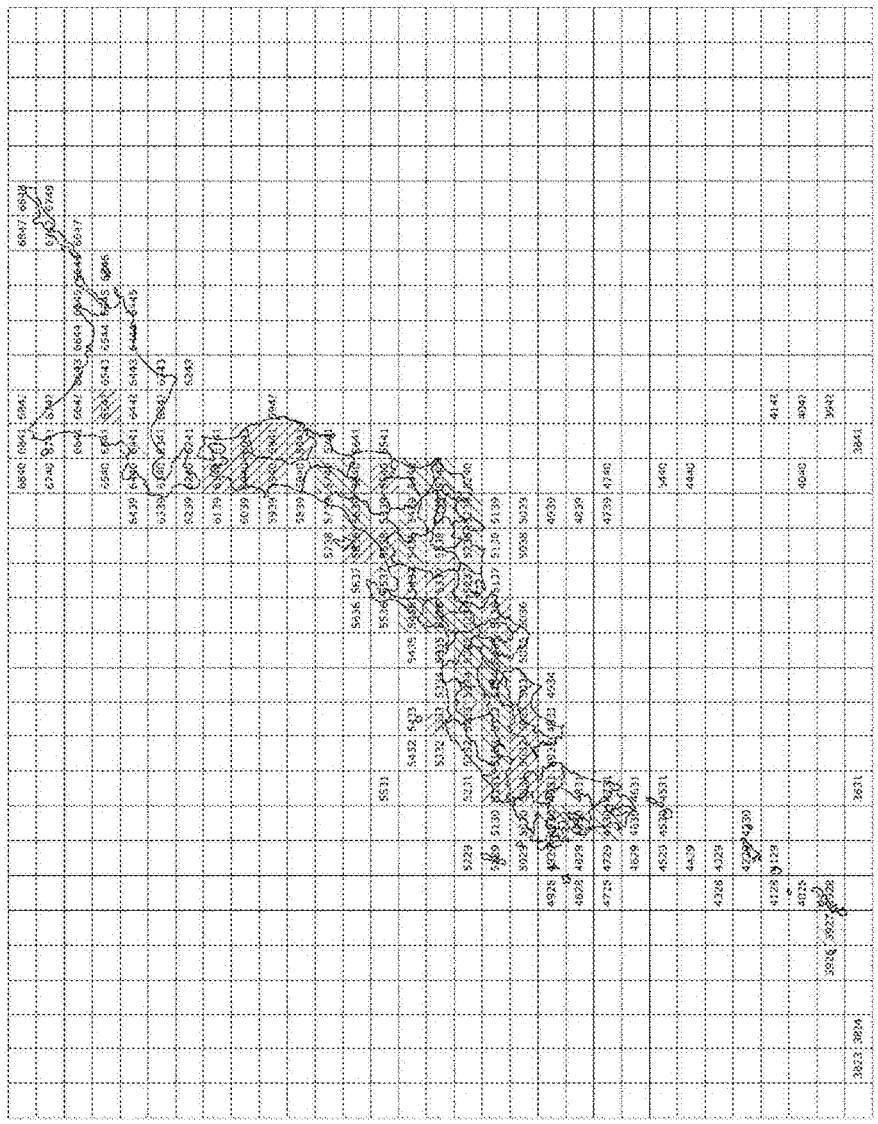
FIG. 8 is a diagram illustrating a state in which the whole area of Japan has been covered using a first-order mesh.
Figure 9:
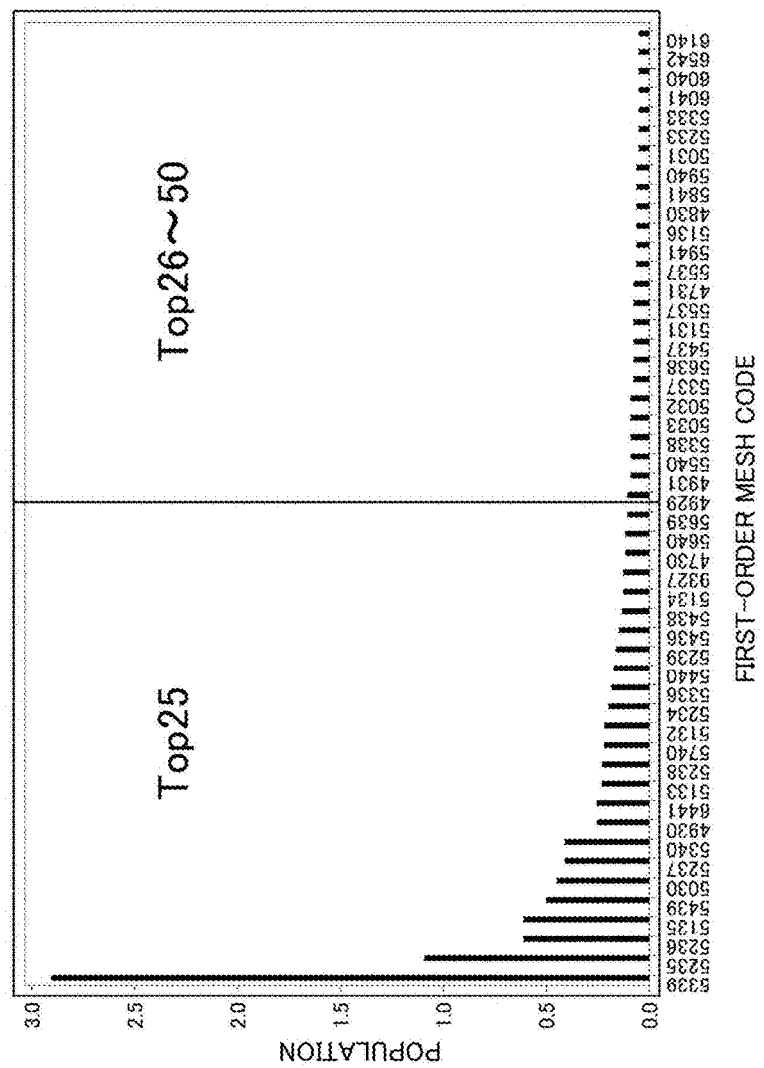
FIG. 9 is a graph illustrating a population distribution of Japan based on the first-order mesh.

FIG. 8 is a diagram illustrating a state in which the whole area of Japan is covered using the first-order mesh. Respective rectangles superposed on the map of Japan are first-order mesh. When the whole area of Japan is covered with the first-order mesh in this manner, a population distribution of Japan becomes as illustrated in FIG. 9. In FIG. 9, the horizontal axis represents first-order mesh code and the vertical axis represents a population in each first-order mesh. It is ascertained that top 25 first-order meshes occupy most of the population in the population distribution illustrated in FIG. 9. It is possible to divide/combine meshes according to the population distribution and optimize the dictionary size.

For example, a mesh corresponding to an area in which there are few people, such as mountain areas having population densities equal to or less than a predetermined value, can be combined because they have little influence on statistical results even if they are combined.

In the present embodiment, a dictionary is updated and optimized in accordance with a distribution of position information while the position information is collected from the terminal devices 100 as data. Reliabilities of respective data types constituting the dictionary are calculated, and data types constituting the dictionary are combined and divided depending on reliabilities to update the dictionary size. Then, local type differential privacy is executed using the updated dictionary and the reliabilities are re-evaluated. Further, data types of the dictionary are combined and divided depending on the reliabilities to update the dictionary. It is possible to acquire an accurate user distribution of the terminal devices 100 while protecting personal information using differential privacy by repeating this procedure until the reliabilities become a constant state. It is possible to reduce an error to improve reliabilities by combining data types of the dictionary to decrease the dictionary size.

In addition, since specific values of the first-order mesh, the second-order mesh, and the third-order mesh vary according to information with respect to meshes on the Internet which is referred to, the present technology is not limited to the aforementioned specific numbers of meshes.

[2-3. Configuration of Terminal Device 100]

Figure 10:
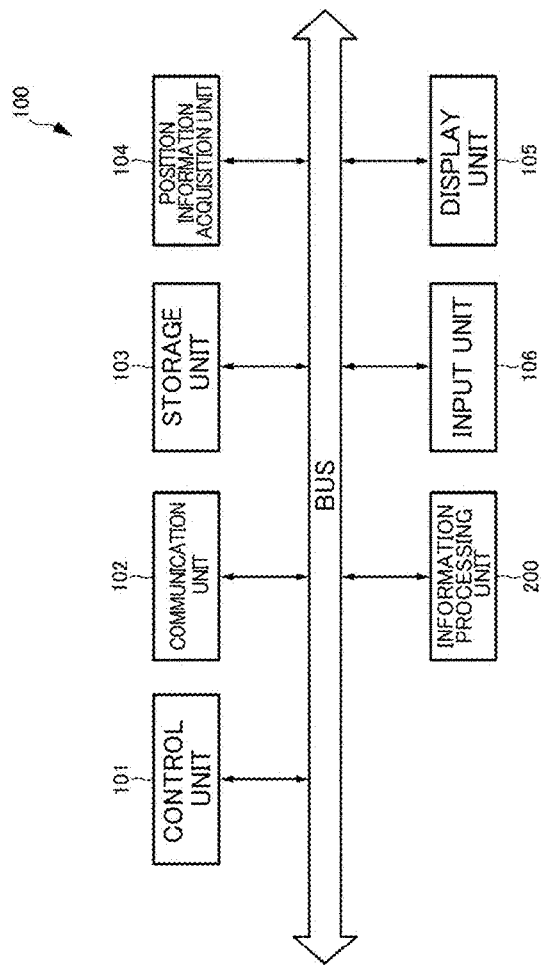
FIG. 10 is a block diagram illustrating a configuration of a terminal device 100.

Next, a configuration of the terminal device 100 will be described. As illustrated in FIG. 10, the terminal device 100 includes a control unit 101, communication unit 102, a storage unit 103, a position information acquisition unit 104, a display unit 105, an input unit 106, and a data processing unit 200. Meanwhile, although a number of terminal devices 100 are connected to the server device 300, only one terminal device 100 is illustrated in detail for convenience of description and drawing. Further, data is position information indicating a current position of the terminal device 100 in the following description.

The control unit 101 includes a central processing unit (CPU), a random access memory (RAM), a read only memory (ROM), and the like. The ROM stores programs read and operated by the CPU. The RAM is used as a work memory of the CPU. The CPU performs various types of processing according to programs stored in the ROM to issue commands, thereby performing control of the entire terminal device 100.

The communication unit 102 is a communication module that communicates with other devices and the Internet according to a predetermined communication standard. As a communication method, there is a wireless local area network (LAN) such as Wi-Fi (Wireless Fidelity), 4G (fourth-generation mobile communication system), broadband, Bluetooth (registered trademark), or the like.

The storage unit 103 is a storage medium configured as, for example, a hard disk drive (HDD), a semiconductor memory, a solid state drive (SSD), or the like and stores data such as applications and programs in addition to content data such as image data, moving image data, audio data, and text data.

The position information acquisition unit 104 is a global positioning system (GPS) module for acquiring position information of the terminal device 100.

The display unit 105 is a display device for displaying content such as images and videos, a user interface, and the like. As a display device, for example, there is a liquid crystal display (LCD), a plasma display panel (PDP), an organic electroluminescence (EL) panel, or the like.

The input unit 106 is various input devices by which a user inputs instructions to the terminal device 100. As the input unit 106, there is a button, a touch screen integrated with the display unit 105, or the like. When an input is applied to the input unit 106, a control signal according to the input is generated and output to the control unit 101 or the data processing unit 200.

The data processing unit 200 is a processing unit configured by the terminal device 100 executing a program. The program may be installed in the terminal device 100 in advance, downloaded, or distributed by a storage medium or the like so that the user can install the program by himself or herself. Further, the data processing unit 200 may be realized not only by the program but also as a combination of a dedicated device, a circuit, and the like using hardware having functions of the data processing unit 200. The data processing unit 200 corresponds to a data processing device in the claims.

Figure 11:
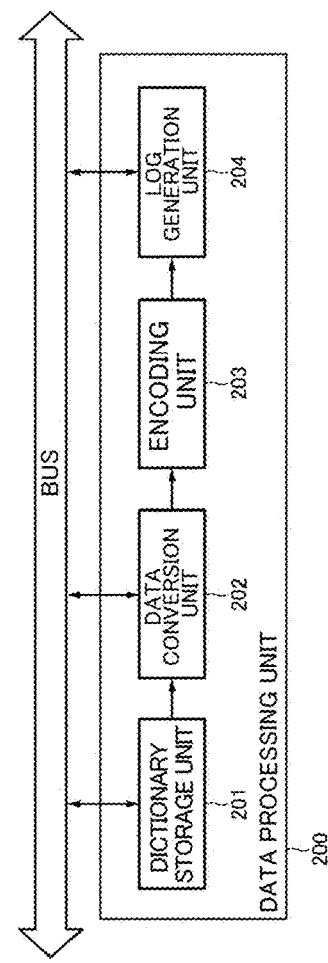
FIG. 11 is a block diagram illustrating a configuration of a data processing unit 200.

As illustrated in FIG. 11, the data processing unit 200 includes a dictionary storage unit 201, a data conversion unit 202, an encoding unit 203, and a log generation unit 204.

The dictionary storage unit 201 is a storage unit that stores a dictionary transmitted from the server device 300. An initial dictionary generated by a dictionary creation unit 401 of the server device 300 is stored first, and then a dictionary updated by a dictionary updating unit 408 of the server device 300 is stored.

The data conversion unit 202 acquires a code (regional mesh code) indicating a regional mesh including a position indicated by position information of the terminal device 100 acquired by the position information acquisition unit 104 on the basis of the position information. The regional mesh code can be acquired by referring to a dictionary having regional mesh codes as data types, transmitted from the server device 300. Since the dictionary is repeatedly updated by a data processing unit 400 of the server device 300 and supplied to the terminal device 100, a code of the regional mesh including the position indicated by the position information may also be different according to an update result.

The encoding unit 203 adds noise to position information and a regional mesh code that are data to be transmitted to the server device 300. The amount of noise to be added is determined in advance by a privacy index.

The log generation unit 204 generates a log to be transmitted to the server device 300. The log includes position information and a regional mesh code to which noise has been added, a privacy index that is parameter information of differential privacy, identification information (ID) of the terminal device 100, a time stamp, and the like. The generated log is transmitted to the server device 300 via the network 1000 through communication according to the communication unit 102. Meanwhile, invariable information such as the privacy index and the identification information need not be included in the log if the terminal device 100 and the server device 300 share the same in advance.

The terminal device 100 is configured as described above.

[2-4. Configuration of Server Device 300]

Figure 12:
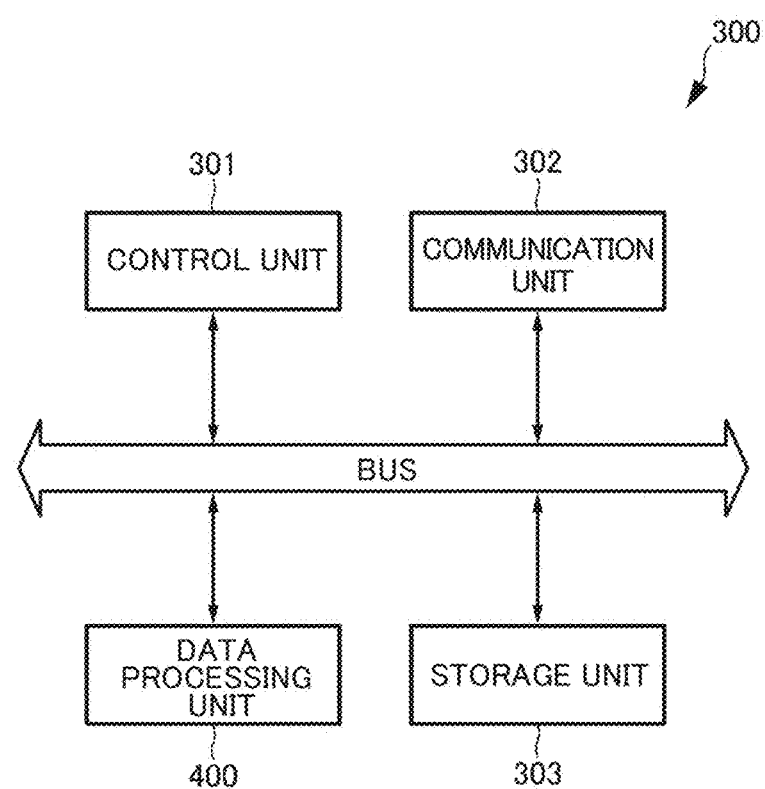
FIG. 12 is a block diagram illustrating a configuration of a server device 300.

Next, a configuration of the server device 300 will be described. As illustrated in FIG. 12, the server device 300 includes a control unit 301, a communication unit 302, a storage unit 303, and the data processing unit 400.

The control unit 301 includes a CPU, a RAM, a ROM, and the like. The CPU performs various types of processing according to programs stored in the ROM to issue commands, thereby performing control of the entire server device 300.

The communication unit 302 is a communication module that communicates with the terminal device 100 and the Internet according to a predetermined communication standard. As a communication method, there is a wireless LAN such as Wi-Fi, 4G, broadband, Bluetooth (registered trademark), or the like.

The storage unit 303 is a storage medium configured as, for example, an HDD, a semiconductor memory, an SSD, or the like and stores applications, programs, logs and data transmitted from the terminal device 100, and the like.

The data processing unit 400 is a processing unit configured by the server device 300 executing a program. The program may be installed in the server device 300 in advance, downloaded, or distributed by a storage medium or the like so that the user can install the program by himself or herself. Further, the data processing unit 400 may be realized not only by the program but also as a combination of a dedicated device, a circuit, and the like using hardware having functions of the data processing unit 400. The data processing unit 400 corresponds to a data processing device in the claims.

Figure 13:
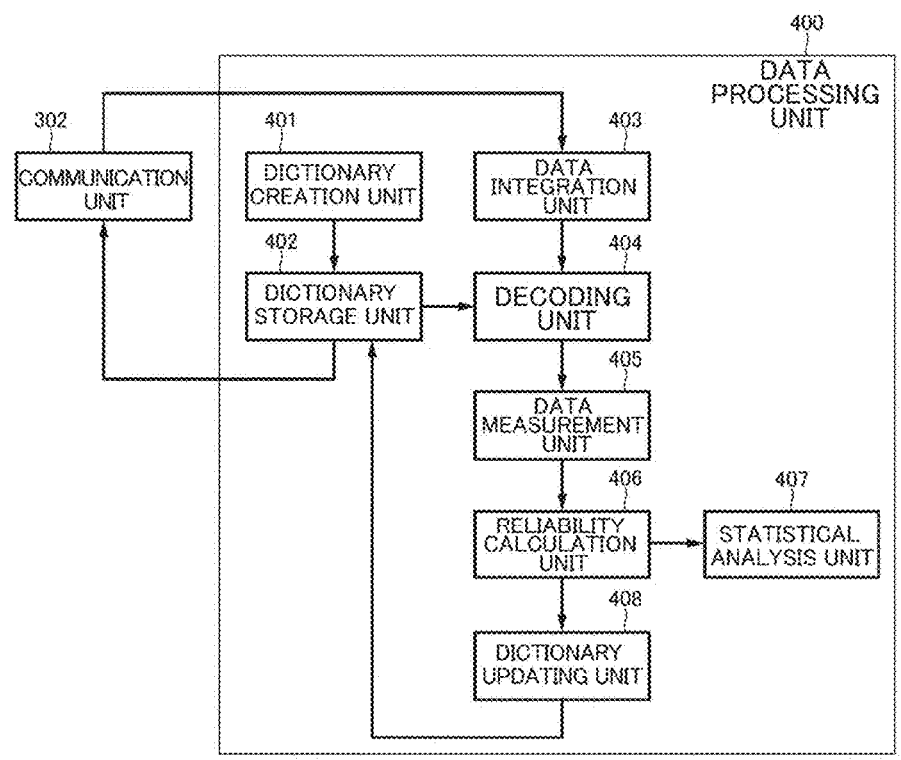
FIG. 13 is a block diagram illustrating a configuration of a data processing unit 400.

As illustrated in FIG. 13, the data processing unit 400 includes the dictionary creation unit 401, a dictionary storage unit 402, a data integration unit 403, a decoding unit 404, a data measurement unit 405, a reliability calculation unit 406, a statistical analysis unit 407, and the dictionary updating unit 408.

The dictionary creation unit 401 generates a dictionary as a data set using existing information and the like. The dictionary generated by the dictionary creation unit 401 is updated through processing of the data processing unit 400. The dictionary creation unit 401 corresponds to a data set generation unit in the claims. Data of the dictionary generated by the dictionary creation unit 401 is stored in the dictionary storage unit 402, and transmitted to the terminal device 100 and stored in the dictionary storage unit 201 of the data processing unit 200 of the terminal device 100.

Meanwhile, statistical information of a population distribution of a second-order mesh is opened by the Ministry of Internal Affairs and Communications and can be acquired through the Internet. The dictionary creation unit 401 can generate an initial dictionary using this statistical information of the population distribution. Then, the dictionary creation unit 401 repeatedly updates the initial dictionary by executing local type differential privacy to generate an optimized dictionary with reliability in a constant state.

Processing in the data processing unit 400 is performed for any of a first-order mesh, a second-order mesh, and a third-order mesh. It is possible to obtain more specific statistical results by performing the processing for the second-order mesh rather than the first-order mesh, and the third-order mesh rather than the second-order mesh. Meshes that will be a target of the processing may be set, for example, by an operator of the server device 300 in advance in the data processing unit 400. The dictionary creation unit 401 generates a dictionary in accordance with this setting. For example, when the processing is performed for the second-order mesh, a dictionary having the secondary mesh as data types is generated from statistical information of a population distribution in each second-order mesh. Further, the processing may be performed in parallel for all of the first-order mesh, the second-order mesh, and the third-order mesh, or the processing may be performed in parallel for any two types of meshes.

Since there is a correlation between users of the terminal devices 100 and a population (it is conceived that there are many users of the terminal devices 100 in an area with a large population and there are few users of the terminal devices 100 in an area with a small population), it is possible to perform optimization of a dictionary, for example, by combining regional meshes in which populations are 0 or not more than a predetermined number in a dictionary creation step.

The dictionary storage unit 402 is a storage unit that stores dictionaries. An initial dictionary generated by the dictionary creation unit 401 is stored first, and then a dictionary updated by the dictionary updating unit 408 is stored.

The data integration unit 403 integrates position information of the terminal devices 100 which is data to which noise has been added from logs received from the terminal devices 100 through communication according to the communication unit 302. The integrated data is supplied to the decoding unit 404.

The decoding unit 404 performs processing of removing noise from the data to which the noise has been added, supplied from the data integration unit 403. The decoding unit 404 corresponds to a noise removal unit in the claims. The data from which the noise has been removed is supplied to the data measurement unit 405.

The data measurement unit 405 measures the position information of the terminal devices 100 which is the data from which the noise has been removed for each data type (each regional mesh code in this example). In the present embodiment, the number of pieces of position information (the number of terminal devices 100) for each regional mesh code is measured. The data measurement unit 405 corresponds to a measurement unit in the claims.

The reliability calculation unit 406 calculates a reliability for each data type. The calculated reliability is supplied to the statistical analysis unit 407 and the dictionary updating unit 408.

The statistical analysis unit 407 creates a heat map in order to visualize measurement results, reliabilities, and the like. Meanwhile, the statistical analysis unit 407 is not an essential component in the present technology.

The dictionary updating unit 408 performs dictionary update processing on the basis of reliabilities. A dictionary is stored in the dictionary storage unit 402, and transmitted to the terminal device 100 and stored in the dictionary storage unit 201 whenever it is updated. When the dictionary is updated, local type differential privacy is re-executed on the basis of the updated dictionary and update of the dictionary is repeated until reliabilities become a constant state. The dictionary updating unit 408 corresponds to a data set updating unit in the claims, and update of a dictionary corresponds to update of a data set.

The server device 300 is configured as described above.

[2-5. Processing in Terminal Device 100]

Next, processing in the terminal device 100 will be described. Meanwhile, the following processing is performed for any of first-order mesh, second-order mesh, and third-order mesh. This is based on which mesh is a target of data types in a dictionary, as described above.

Figure 14:
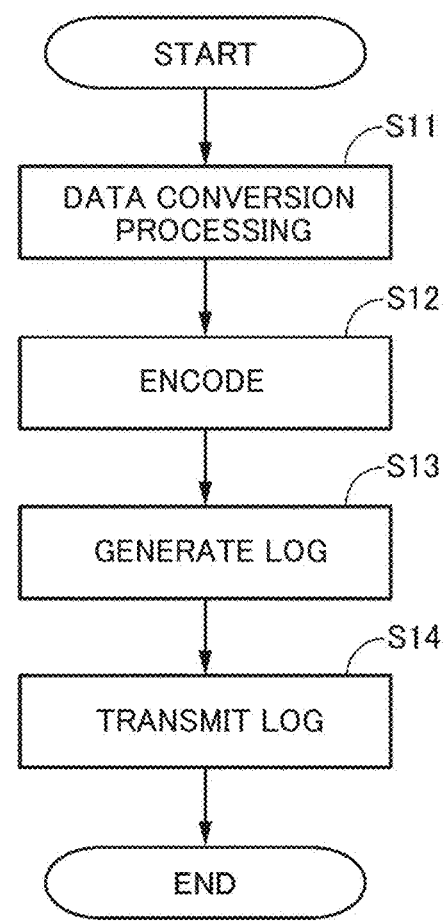
FIG. 14 is a flowchart illustrating processing in the terminal device 100.

As illustrated in the flowchart of FIG. 14, the data conversion unit 202 of the terminal device 100 acquires a regional mesh code corresponding to position information acquired by the position information acquisition unit 104 on the basis of the position information in step S11.

Next, the encoding unit 203 adds noise to the position information and the regional mesh code in step S12. This noise is for protecting privacy information of data according to differential privacy, and it is assumed that a privacy index that determines a noise amount to be added is predetermined.

Next, the log generation unit 204 generates a log to be transmitted to the server device 300 in step S13. The log includes position information and a regional mesh code to which noise has been added, a privacy index that is parameter information of differential privacy, identification information (ID) of the terminal device 100, a time stamp, and the like.

Then, the communication unit 102 transmits the log to the server device 300 in step S14. Further, when the log is transmitted to the server device 300, header information specific to the terminal device 100 which is necessary for transmission is added to the log.

The terminal device 100 repeatedly performs this processing regularly or at a predetermined timing.

[2-6. Processing in Server Device 300]

Figure 15:
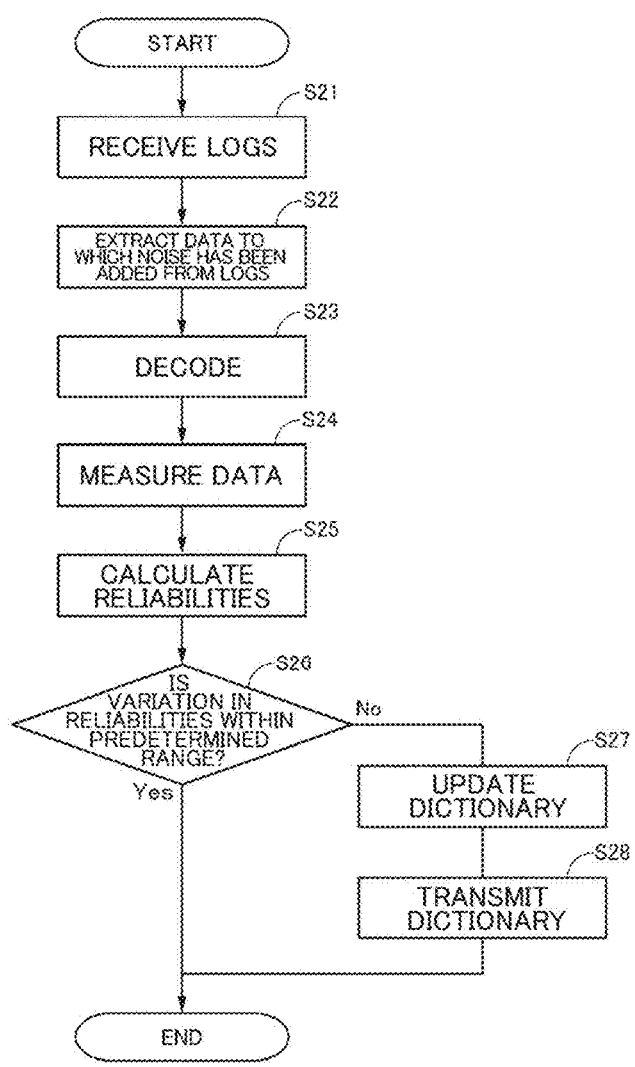
FIG. 15 is a flowchart illustrating processing in the server device 300.

Next, processing in the server device 300 will be described. As illustrated in the flowchart of FIG. 15, first, logs transmitted from all terminal devices 100 connected through the network 1000 are received in step S21. Further, since a number of terminal devices 100 are present, the server device 300 receives logs from the respective terminal devices 100.

Next, the data integration unit 403 extracts data to which noise has been added from the received plurality of logs in step S22. The extracted data is position information and regional mesh codes.

Next, the decoding unit 404 removes noise from the data to which noise has been added in step S23.

Next, the data measurement unit 405 measures the number of pieces of data for each data type (the number of pieces of position information of the terminal devices 100 for each regional mesh code as a data type) in step S24. This data measurement result is used in calculation of reliabilities and thus is supplied to the reliability calculation unit 406.

Next, the reliability calculation unit 406 calculates reliabilities by combining the data measurement result in step S24 and past data measurement results stored therein in step S25. Further, in the case of the first processing, reliabilities are calculated from only one measurement result or calculation of reliabilities is not performed because past data measurement results are not present. In the second and following processing, reliabilities are calculated from the latest data measurement results and past data measurement results. In addition, the reliability calculation unit 406 calculates an average noise addition amount.

Here, calculation of the average noise addition amount is described. The average noise addition amount is an average of standard deviations of measurement results for each data type after a plurality of times of data measurement in all data types.

For example, it is assumed that a measured value (measured value in a state in which noise has not been added) of a data type V13 is 10,000 and measured values from a total of six times of data measurement in a state in which noise has been added are 10,000, 10,200, 9,800, 10,000, 10,200, and 9,800. A standard deviation of these measured values from the six times of data measurement is about 163. Accordingly, noise corresponding to 163 has been added to the data type V13.

When noise is added on the side of the terminal device 100, noise is uniformly added to data types because a measured value of each data type cannot ascertained.

Accordingly, for example, it is assumed that a measured value (measured value in a state in which noise has not been added) of a data type V4 is 1,000 and measured values from a total of six times of data measurement in a state in which noise has been added are 1,000, 1,200, 800, 1,000, 1,200, and 800. A standard deviation of these measured values from the six times of data measurement is about 163. Accordingly, noise corresponding to 163 has been added to the data type V4.

Although V4 has the measured value corresponding to a tenth of the measured value of V13 in the state in which noise has not been added, differential privacy adds the same noise corresponding to 163 without knowing the measured value in the state in which noise has not been added, which increases an error.

Description returns to explanation of the flowchart. Next, it is determined whether variation in reliabilities falls within a predetermined range by comparing the calculated reliabilities with reliabilities calculated in previous processing in step S26. When the variation in the reliabilities is within the predetermined range, processing ends on the assumption that the dictionary size is appropriate (Yes in step S26).

In contrast, when the variation in the reliabilities is not within the predetermined range, processing proceeds to step S27 on the assumption that the dictionary size is not appropriate (No in step S26). Next, the dictionary updating unit 408 performs dictionary update processing in step S27. Details of the dictionary update processing will be described later.

Then, the updated dictionary is transmitted to all terminal devices 100 constituting the data processing system 10 through communication according to the communication unit 302 in step S28. The dictionary is transmitted to all the terminal devices 100 whenever it is updated.

[2-7. Dictionary Update Processing]

Figure 16:
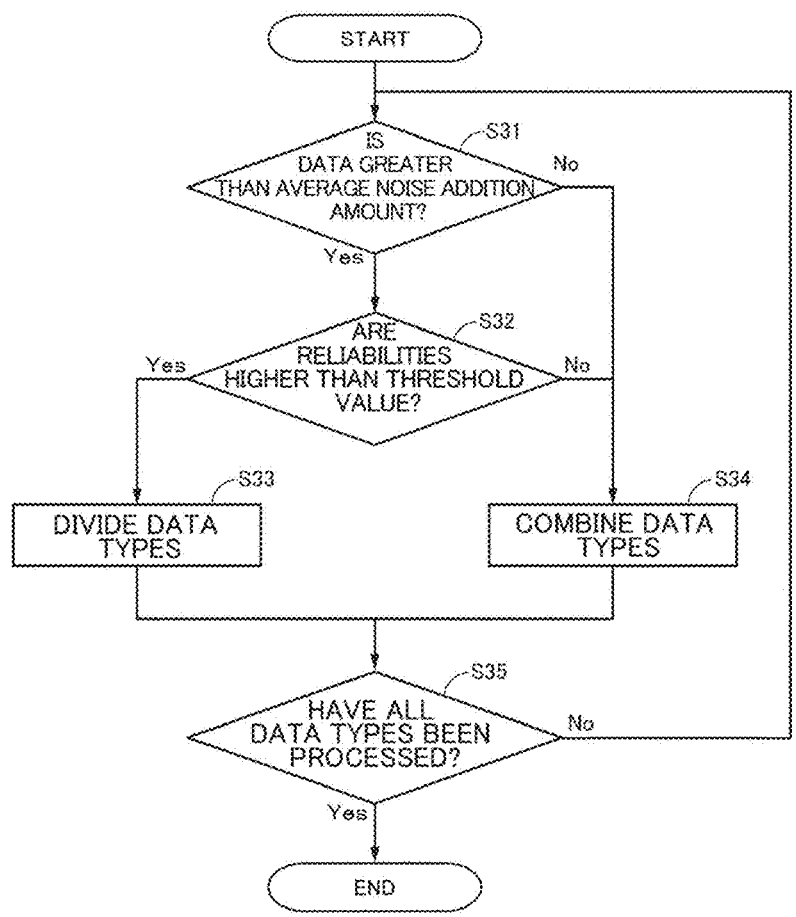
FIG. 16 is a flowchart illustrating dictionary updating processing.

Next, details of the dictionary update processing of step S27 in the flowchart of FIG. 15 will be described with reference to FIG. 16. This processing is performed for each data type constituting the dictionary.

First, it is determined whether measured values of data in one of all data types transmitted and acquired from all terminal devices 100 connected to the server device 300 through the network 1000 are greater than an average noise addition amount in step S31. In the present embodiment, it is determined whether the number of pieces of position information included in a regional mesh that is a data type indicated by a regional mesh code is greater than the average noise addition amount. When the measured values of the data are greater than the average noise addition amount, processing proceeds to step S32 (Yes in step S31).

Noise is uniformly added to all data types irrespective of measured values of data of each data type. Accordingly, the average noise addition amount can be used as a threshold value for determining the sizes of measured values of data of each data type.

Next, it is determined whether the reliabilities calculated in step S25 are higher than a predetermined threshold value in step S32. When the reliabilities are higher than the threshold value, processing proceeds to step S33 (Yes in step S32) in which the regional mesh that is the data type corresponding to a processing target is divided. The number of divisions is 2, for example.

In contrast, when the reliabilities are lower than the threshold value in step S32, processing proceeds to step S34 (No in step S32). Further, when the values of the data of the data type are less than the average noise addition amount in step S31, processing also proceeds to step S34 (No in step S31). Then, the data type (regional mesh) that is the processing target is combined with a data type with a low reliability among neighboring data types in step S34. In this case, "data type neighboring the data type that is the processing target" is a neighboring data type in a state in which data types are arranged on a graph according to a predetermined rule.

Both the processes of steps S33 and S34 proceed to step S35, and it is determined whether processing with respect to all data types (regional mesh) constituting the dictionary has been performed in step S35. When processing with respect to all data types has been performed, processing ends (Yes in step S35).

In contrast, when processing with respect to all data types (regional mesh) has not be performed, processing proceeds to step S31 (No in step S35). Then, step S31 to step S35 are repeated until processing is performed on all pieces of data received in step S21 of the flowchart of FIG. 15.

Accordingly, it is possible to reduce the dictionary size as a result of a plurality of operations of combining data types (regional mesh), for example. The dictionary is updated by repeating combination/division of data types constituting the dictionary depending on a distribution and reliabilities of data types while collecting data types. Then, the updated dictionary is transmitted to the terminal devices 100, local type differential privacy is executed using the updated dictionary, and measurement of data is performed for each data type to evaluate reliabilities (step S25 in the flowchart of FIG. 16). Accordingly, the dictionary is continuously updated until reliabilities do not change.

The dictionary updated in this manner is stored in the dictionary storage unit 402 of the server device 300, and transmitted to the terminal device 100 and stored in the dictionary storage unit 201 of the terminal device 100. Accordingly, the terminal device 100 and the server device 300 have the common updated dictionary all the time. The terminal device 100 and the server device 300 need to have the same dictionary because collection of data, addition of noise in differential privacy, and evaluation of reliabilities are performed for each data type constituting the dictionary.

Figure 17:
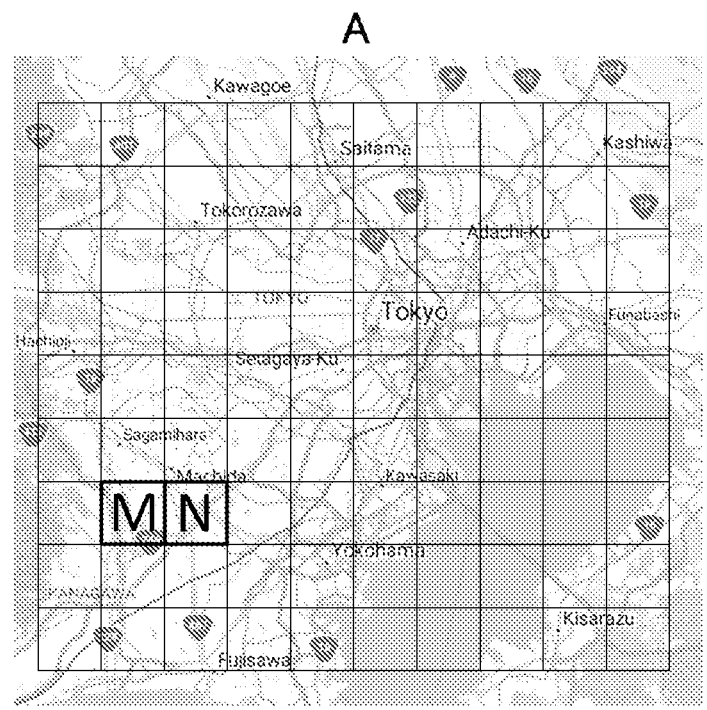
FIG. 17 is an explanatory diagram of combining of a regional mesh.
Figure 17:
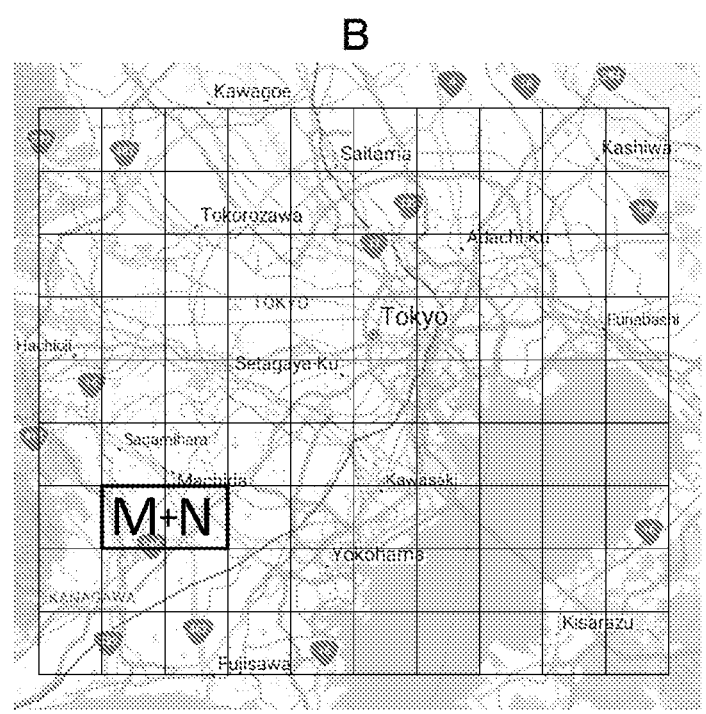

For example, as a result of update of a dictionary through processing performed on second-order mesh, a mesh M (data type) and a mesh N (data type) that were independent meshes before the processing, as illustrated in FIG. 17A, are combined to become one "mesh M+N" as illustrated in FIG. 18B. Although position information in the mesh M and the mesh N has been individually measured as data of data types before combination, position information in the combined "mesh M+N" is measured as data of one data type after combination.

It is possible to reduce an error between a correct answer value and a measurement value to which noise has been added even though noise is added to data in differential privacy to obtain statistical results with high accuracy by repeatedly updating a dictionary as described above to decrease the number of data types and the dictionary size.

Further, information indicating a current state of a dictionary (the number of updates and a version) may be included in a log transmitted from the terminal device 100 to the server device 300, and the server device 300 may check the current state of the dictionary of the terminal device 100 and perform dictionary update processing when the dictionary is the same as a dictionary stored in the dictionary storage unit 402 of the server device 300. In addition, a dictionary used in the terminal device 100 and the server device 300 may be updated at the same timing to new one with reference to a time stamp included in the log. However, processing may continue even if dictionary update timings in the terminal device 100 and the server device 300 do not coincide and the terminal device 100 and the server device 300 use different dictionaries.

Further, the data type is the regional mesh and a mesh is associated with an actual region. Accordingly, if data types are simply combined, for example, a situation in which a regional mesh in Hokkaido and a regional mesh in Okinawa are combined may occur. Accordingly, conditions that "combination of data types is subject to geographically adjacent regional meshes" or "combination of data types gives priority to geographically adjacent regional meshes" may be set. However, combination of geographically separated regional meshes is not excluded. In an area with a small population, geographically separated regional meshes may be combined because the combination does not have a great influence on statistical results.

Processing is performed as described above according to the present technology. According to the present technology, it is possible to reduce the size of a dictionary that is a data set having regional meshes as data types by combining regional meshes having small populations (having a small number of users of terminal device 100). By reducing the dictionary size, it is possible to obtain statistical results with a smaller error when local type differential privacy is used even though the number of pieces of collected data is small.

When differential privacy is used, as the number of pieces of collected data and a sample size increase, an error between a correct answer value and a measurement value to which noise has been added decreases to improve accuracy, in general. However, according to the present technology, it is possible to execute differential privacy with high accuracy even when the number of pieces of collected data and a sample size are small by combining data types included in the dictionary to reduce the number of data types and increasing the number of pieces of data included in each data type.

Further, when processing is performed using a second-order mesh as data types, for example, data types may be combined with respect to only second-order meshes included in the same first-order mesh. Accordingly, geographically separated second-order meshes (e.g., second-order meshes in Hokkaido and second-order meshes in Okinawa) are not combined.

Figure 18:
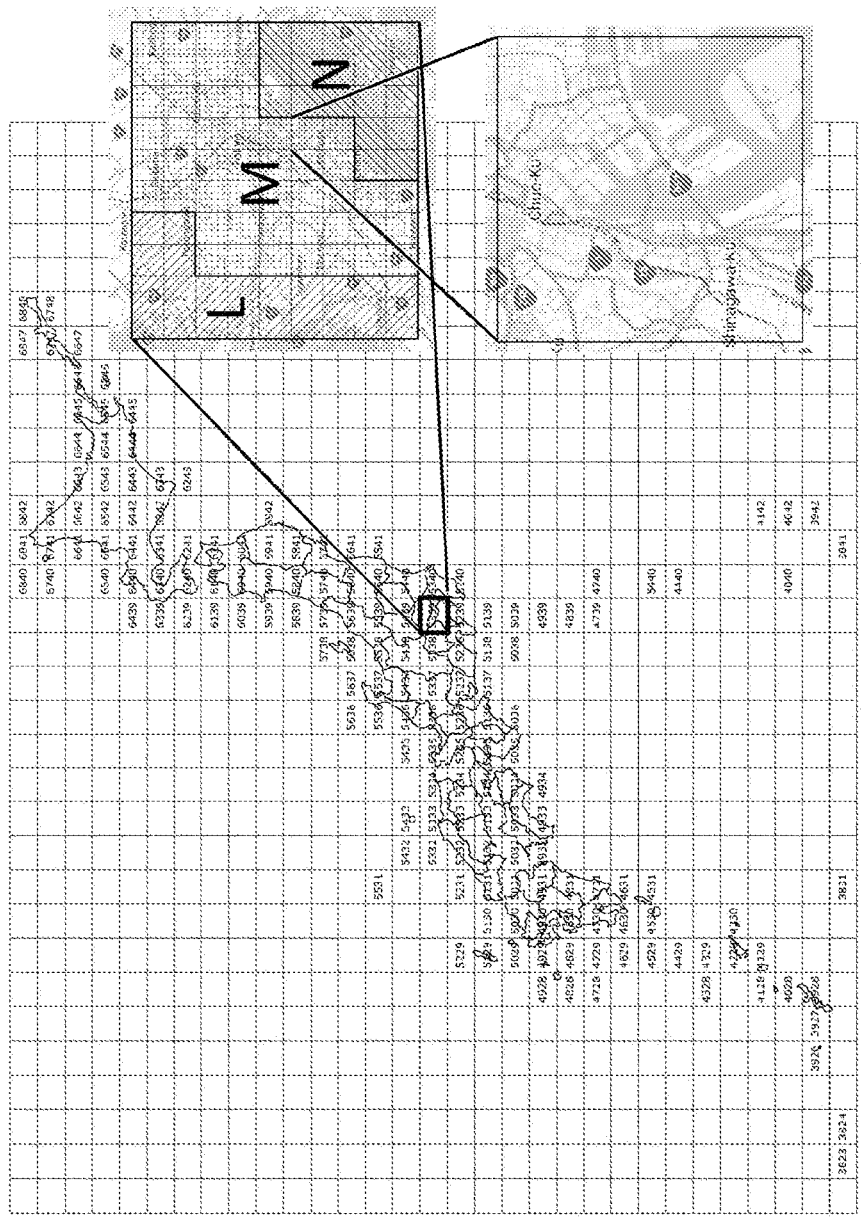
FIG. 18 is an explanatory diagram of division of a regional mesh.

In addition, there is also a case in which a region with a large population and a region with a small population are present in one regional mesh. In such a case, a mesh having a specific size may be set in the regional mesh. For example, as illustrated in FIG. 18, a second-order mesh is clustered into a plurality of grid squares (three squares of L, M, and N in FIG. 18) on the basis of a population density and a first-order mesh is divided on the basis of the clustering (three divisions in FIG. 18). Then, the three divided regions of the first-order mesh are set as individual meshes. Accordingly, it is possible to obtain more detailed statistical results.

3. Modified Examples

Although the embodiment of the present technology has been specifically described above, the present technology is not limited to the above-described embodiment, and various modifications based on the technical spirit of the present technology are possible.

Although a case in which the number of users of the terminal devices 100 is ascertained using a regional mesh is exemplified in the embodiment, the present technology is not limited thereto. For example, any data that can be handled as statistical data, such as the frequency of use of a pictorial symbol used by users in character input to terminal devices, the frequency of use of an application operating in the terminal devices, and measured values of temperatures of regions, can be applied.

Although the terminal device is described as a smartphone in the embodiment, the terminal device may be any device that can transmit information to the outside, such as a personal computer, a tablet terminal, a camera, a wearable device, a smart speaker, a game machine, a server device, an Internet accessible pet animal type/humanoid robot, various sensor devices, and various IoT (Internet of Things) devices, in addition to the smartphone.

The present technology can also be configured as follows.

(1)
A data processing device including:
a noise removal unit that removes noise from data to which noise has been added, the data having been received from a terminal device;
a measurement unit that measures the data for each data type constituting a data set and indicating a classification of the data; and
a data set updating unit that updates the data set on the basis of a measurement result of the measurement unit.

(2)
The data processing device according to (1), wherein the data set updating unit updates the data set by combining data types constituting the data set with other data types.

(3)
The data processing device according to (1) or (2), wherein the data set updating unit updates the data set by dividing data types constituting the data set.

(4)
The data processing device according to any one of (1) to (3), including a reliability calculation unit that calculates a reliability for each data type on the basis of the measurement result, wherein
the data set updating unit updates the data set whenever the data is received from the terminal device until a variation in the reliability and reliabilities calculated prior to the reliabilities falls within a predetermined range.

(5)
The data processing device according to any one of (1) to (4), wherein the reliabilities are variation coefficients of the measurement result and a plurality of measurement results prior to the measurement result.

(6)
The data processing device according to (3), wherein the data type is divided when the data belonging to the data type is greater than an amount of the noise added to the data and the reliability is higher than a predetermined threshold value.

(7)
The data processing device according to (3), wherein the data type is combined when the data belonging to the data type is less than the amount of the noise added to the data or the reliability is lower than a predetermined threshold value.

(8)
The data processing device according to (7), wherein the data set updating unit combines the data type with other data types approximating the measurement result of the data and having lower reliabilities than the data type.

(9)
The data processing device according to any one of (1) to (8), wherein, when the data set is updated by the data set updating unit, the measurement unit measures the data for each data type constituting the updated data set.

(10)
The data processing device according to any one of (1) to (9), including a data set generation unit that generates the data set.

(11)
The data processing device according to any one of (1) to (10), wherein the data set is transmitted to the terminal device whenever updated.

(12)
A data processing method including: removing noise from data to which noise has been added, the data having been received from a terminal device;
measuring the data for each data type constituting a data set and indicating a classification of the data; and
updating the data set on the basis of a measurement result.

(13)
A data processing program causing a computer to execute a data processing method including:
removing noise from data to which noise has been added, the data having been received from a terminal device;
measuring the data for each data type constituting a data set and indicating a classification of the data; and
updating the data set on the basis of a measurement result.

(14)
A terminal device that associates data with data types on the basis of information indicating a data set composed of the data types to which the data belongs, the data set having been transmitted from a data processing device, then adds noise to the data, and transmits the data to which noise has been added to the data processing device.

(15)
A data processing system including:
a terminal device that associates data with data types on the basis of information indicating a data set composed of the data types to which the data belongs, the data set having been transmitted from a data processing device, then adds noise to the data, and transmits the data to which noise has been added to the data processing device; and
a data processing device including:
a noise removal unit that removes noise from data to which noise has been added, the data having been received from the terminal device;
a measurement unit that measures the data for each data type constituting a data set and indicating a classification of the data; and
a data set updating unit that updates the data set on the basis of a measurement result of the measurement unit.

REFERENCE SIGNS LIST

10 Data processing system
100 Terminal device
400 Data processing unit
404 Decoding unit
405 Data measurement unit
406 Reliability calculation unit
408 Dictionary updating unit

The invention claimed is:
1. A data processing device comprising:
a noise removal unit configured to remove noise from data to which noise has been added, the data having been received from a terminal device;
a measurement unit configured to measure the data for each data type constituting a data set and indicating a classification of the data; and
a data set updating unit configured to update the data set based on a data distribution of a measurement result of the measurement unit, wherein the data set updating unit updates the data set by setting a size of a dictionary, wherein the dictionary indicates a relationship between each respective data type and a respective classification corresponding to the respective data type, wherein the size of the dictionary indicates a number of data types included in the dictionary, and wherein the noise removal unit, the measurement unit, and the data set updating unit are each implemented via at least one processor.

2. The data processing device according to claim 1, wherein the data set updating unit updates the data set by combining data types constituting the data set with other data types.

3. The data processing device according to claim 1, wherein the data set updating unit updates the data set by dividing data types constituting the data set.

4. The data processing device according to claim 1, further comprising:

a reliability calculation unit configured to calculate a reliability for each data type based on the measurement result, wherein the data set updating unit updates the data set whenever the data is received from the terminal device, until a variation between the calculated reliability and reliabilities calculated prior to the calculated reliability falls within a predetermined range, wherein the reliability calculation unit is implemented via at least one processor.

5. The data processing device according to claim 4, wherein the reliabilities comprise variation coefficients of the measurement result and a plurality of measurement results prior to the measurement result.

6. The data processing device according to claim 3, wherein the data type is divided when the data belonging to the data type is greater than an amount of the noise added to the data and the reliability is higher than a predetermined threshold value.

7. The data processing device according to claim 3, wherein the data type is combined when the data belonging to the data type is less than an amount of the noise added to the data or the reliability is lower than a predetermined threshold value.

8. The data processing device according to claim 7, wherein the data set updating unit combines the data type with other data types approximating the measurement result of the data and having lower reliabilities than the data type.

9. The data processing device according to claim 1, wherein, when the data set is updated by the data set updating unit, the measurement unit measures the data for each data type constituting the updated data set.

10. The data processing device according to claim 1, further comprising:

a data set generation unit configured to generate the data set, wherein the data set generation unit is implemented via at least one processor.

11. The data processing device according to claim 1, wherein the data set is transmitted to the terminal device whenever updated.

12. The data processing device according to claim 1, wherein the size of the dictionary is set based on a respective reliability of each respective data type.

13. A data processing method comprising:

removing noise from data to which noise has been added, the data having been received from a terminal device;

measuring the data for each data type constituting a data set and indicating a classification of the data; and updating the data set based on a distribution of a measurement result, wherein the data set is updated by setting a size of a dictionary, wherein the dictionary indicates a relationship between each respective data type and a respective classification corresponding to the respective data type, and wherein the size of the dictionary indicates a number of data types included in the dictionary.

14. A non-transitory computer-readable storage medium having embodied thereon a data processing program, which when executed by a computer causes the computer to execute a data processing method, the data processing method comprising:

removing noise from data to which noise has been added, the data having been received from a terminal device;

measuring the data for each data type constituting a data set and indicating a classification of the data; and updating the data set based on a distribution of a measurement result, wherein the data set is updated by setting a size of a dictionary, wherein the dictionary indicates a relationship between each respective data type and a respective classification corresponding to the respective data type, and wherein the size of the dictionary indicates a number of data types included in the dictionary.

15. A terminal device comprising:

circuitry configured to associate data with data types based on information indicating a data set composed of the data types to which the data belongs, the data set having been transmitted from a data processing device, add noise to the data, and transmit the data to which noise has been added to the data processing device, wherein the data set is updated based on a data distribution of the data types by setting a size of a dictionary, wherein the dictionary indicates a relationship between each respective data type and a respective classification corresponding to the respective data type, and wherein the size of the dictionary indicates a number of data types included in the dictionary.

16. A data processing system comprising:

a terminal device including circuitry configured to associate data with data types based on information indicating a data set composed of the data types to which the data belongs, the data set having been transmitted from a data processing device, add noise to the data, and transmit the data to which noise has been added to the data processing device; and a data processing device including:

a noise removal unit that removes configured to remove noise from data to which noise has been added, the data having been received from the terminal device;

a measurement unit that measures configured to measure the data for each data type constituting a data set and indicating a classification of the data; and a data set updating unit that updates the data set based on a data distribution of a measurement result of the measurement unit, wherein the data set updating unit updates the data set by setting a size of a dictionary, wherein the dictionary indicates a relationship between each respective data type and a respective classification corresponding to the respective data type,
wherein the size of the dictionary indicates a number of data types included in the dictionary, and
wherein the noise removal unit, the measurement unit, and the data set updating unit are each implemented via at least one processor.

\* \* \* \* \*